(12) United States Patent
Brent

(10) Patent No.: US 7,669,059 B2
(45) Date of Patent: Feb. 23, 2010

(54) METHOD AND APPARATUS FOR DETECTION OF HOSTILE SOFTWARE

(75) Inventor: Michael D. Brent, Newark, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 715 days.

(21) Appl. No.: 10/808,260

(22) Filed: Mar. 23, 2004

(65) Prior Publication Data
US 2005/0216749 A1 Sep. 29, 2005

(51) Int. Cl.
*H04L 9/32* (2006.01)
(52) U.S. Cl. .................. 713/188; 713/152; 713/176; 726/22; 726/23; 726/24; 726/25; 726/26
(58) Field of Classification Search .............. 726/188; 713/188
See application file for complete search history.

(56) References Cited
U.S. PATENT DOCUMENTS

| | | | | |
|---|---|---|---|---|
| 5,123,045 A | * | 6/1992 | Ostrovsky et al. | 713/190 |
| 5,315,232 A | * | 5/1994 | Stewart | 324/72 |
| 5,451,230 A | * | 9/1995 | Steinert | 606/107 |

(Continued)

OTHER PUBLICATIONS

Brent, Michael, StartupWatch, Retrieved from Internet: <<URL:http://www.harmlesslion.com/cgi-bin/showprog.cgi?search=startupwatch>>, Mar. 16, 2004, 2 pages total.
Brent, Michael, StartupWatch—Source Code, Retrieved from Internet: <<URL:http://www.harmlesslion.com/cgi-bin/showprog.cgi?search=startupwatch>>, Jun. 16, 2004, 23 pages total.

(Continued)

*Primary Examiner*—Kambiz Zand
*Assistant Examiner*—Yonas Bayou
(74) *Attorney, Agent, or Firm*—Townsend and Townsend and Crew LLP

(57) ABSTRACT

Methods and apparatuses are presented for detecting hostile software in a computer system involving storing a representation of configuration data associated with an operating system for the computer system obtained at a first time, comparing the stored representation of the configuration data obtained at the first time with a representation of the configuration data associated with the operating system for the computer system obtained at a second time, and if deviation is detected between the stored representation of the configuration data obtained at the first time and the representation of the configuration data obtained at the second time, automatically performing at least one remedial measure in response to the deviation detected. In one embodiment of the invention, the configuration data relates to identification of executable code installed in the computer system. The configuration data may be obtained from a registry key in a registry maintained by the operating system.

18 Claims, 7 Drawing Sheets

U.S. PATENT DOCUMENTS

| | | | | |
|---|---|---|---|---|
| 5,822,517 | A | * | 10/1998 | Dotan .......................... 726/22 |
| 5,889,943 | A | * | 3/1999 | Ji et al. ........................ 726/22 |
| 5,951,698 | A | * | 9/1999 | Chen et al. ................... 714/38 |
| 6,559,867 | B1 | * | 5/2003 | Kotick et al. ................ 715/771 |
| 7,502,939 | B2 | * | 3/2009 | Radatti ....................... 713/188 |
| 7,509,680 | B1 | * | 3/2009 | Sallam ......................... 726/24 |
| 2001/0037450 | A1 | * | 11/2001 | Metlitski et al. ............ 713/152 |
| 2002/0152399 | A1 | * | 10/2002 | Smith ........................ 713/200 |
| 2003/0088792 | A1 | * | 5/2003 | Card et al. .................. 713/201 |
| 2004/0139334 | A1 | * | 7/2004 | Wiseman .................... 713/188 |
| 2004/0172551 | A1 | * | 9/2004 | Fielding et al. ............. 713/200 |

OTHER PUBLICATIONS

Brent, Michael, StartupWatch—Program Instructional window captions and explanations, Jun. 15, 2004, 1 page total.

Brent, Michael, StartupWatch, Retrieved from Internet <<URL:http://www.harmlesslion.com/cgi-bin/showprog.cgi?search=startupwatch>>, Jun. 16, 2004 [Program on CD-Rom].

* cited by examiner

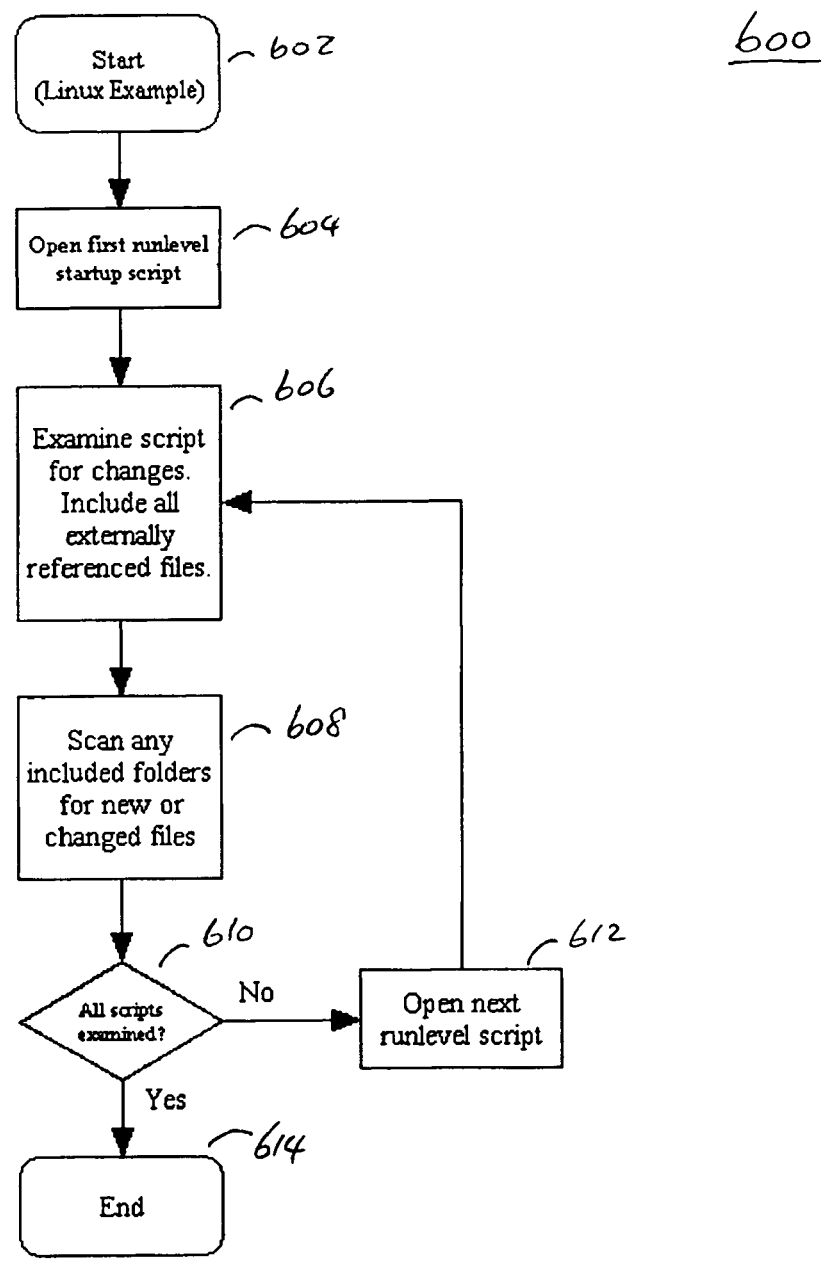

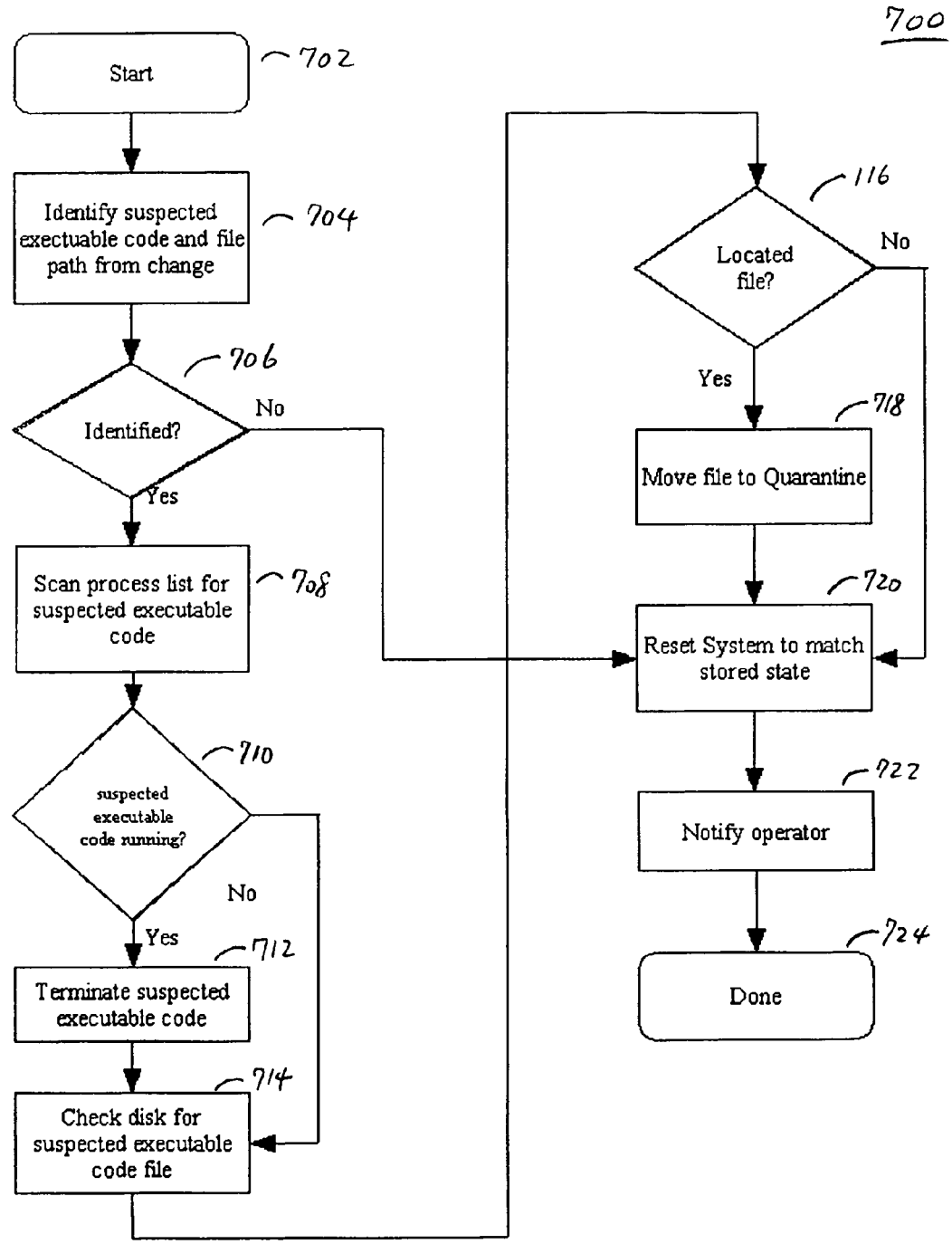

METHOD AND APPARATUS FOR DETECTION OF HOSTILE SOFTWARE

BACKGROUND OF THE INVENTION

As computer systems become more and more interconnected with the expansive use of computer networks, the threat of infection by hostile software transported over such computer networks has steadily increased. Here, hostile software may include any software that could affect a computer system in an undesirable or otherwise unwanted manner. Traditional anti-virus techniques have curtailed the spread of hostile software to a certain extent. However, such techniques typically rely on some type of inspection of a computer system for known hostile software signatures. Thus, such an approach is often incapable of handling hostile software for which a signature has not been positively identified, such as in the case of hostile software that has not yet been created. Even for existing hostile software, delays associated with identification of the hostile software's signature may lead to additional damage and further opportunity for the hostile software to re-spawn.

Furthermore, as hostile software become increasingly sophisticated, the task of identifying such signatures may become significantly more difficult and time-consuming, or worse, may become impossible in some instances. For example, hostile software may mutate such that a previously identified signature for the original hostile software may no longer be useful in identifying the mutated version of the hostile software. Thus, there exists an urgent need for improved techniques to detect and respond to new and more sophisticated hostile software in the face of the ever higher usage of network-enabled computer systems.

BRIEF SUMMARY OF THE INVENTION

The present invention relates to methods and apparatuses for detecting hostile software in a computer system involving storing a representation of configuration data associated with an operating system for the computer system obtained at a first time, comparing the stored representation of the configuration data obtained at the first time with a representation of the configuration data associated with the operating system for the computer system obtained at a second time, and if deviation is detected between the stored representation of the configuration data obtained at the first time and the representation of the configuration data obtained at the second time, automatically performing at least one remedial measure in response to the deviation detected.

In one embodiment of the invention, the configuration data relates to identification of executable code installed in the computer system. The configuration data may also relate to identification of a command line for invoking executable code associated with a particular file extension. The configuration data may be obtained from a registry key in a registry maintained by the operating system. The configuration data may also be obtained from a file stored in the computer system. The stored representation of configuration data is encoded prior to being stored.

The at least one remedial measure may comprise determining a storage location associated with suspected executable code in the computer system, determining whether suspected executable code is currently executing, terminating execution of the suspected executable code without notification, moving suspected executable code to a specified storage location for later evaluation, and/or altering configuration data associated with the operating system to reflect the stored representation of the configuration data.

BRIEF DESCRIPTION OF THE DRAWINGS

FIG. 6 is a more detailed flow chart outlining steps in one example of detecting hostile software in the context of a Linux-based operating system in accordance with one embodiment of the present invention; and FIG. 7 is a more detailed flow chart outlining steps for reacting to detection of hostile software in accordance with one embodiment of the present invention.

DETAILED DESCRIPTION OF THE INVENTION

Figure 1:
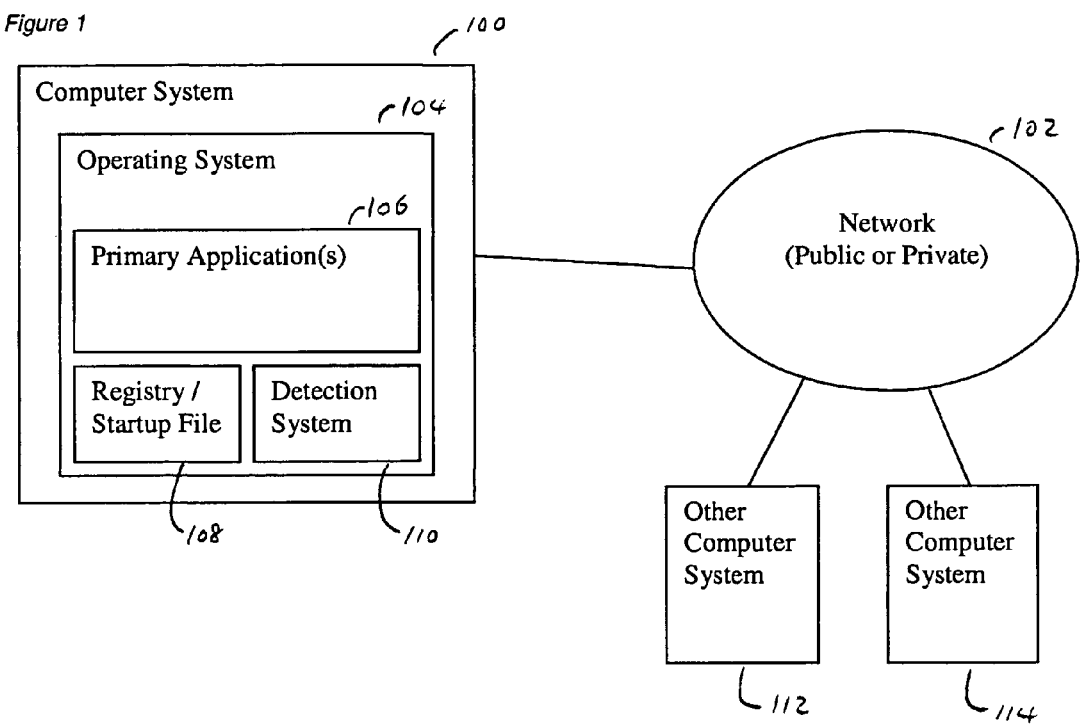
FIG. 1 is a block diagram of a computer system, connected to a network, capable of implementing techniques for detecting and reacting to hostile software in accordance with one embodiment of the present invention.

FIG. 1 is a block diagram of a computer system 100, connected to a network 102, capable of implementing techniques for detecting and reacting to hostile software in accordance with one embodiment of the present invention. Computer system 100 represents any computing devices that may be subject to a threat of hostile software.

Computer system 100 contains an operating system 104 for carrying out basic functions such as file management within computer system 100. As shown in this figure, operating system 104 contains primary applications 106, registry/start up file 108, and detection system 110. Although not shown in FIG. 1, the computer system 100 typically includes a processing unit for carrying out machine instructions and a storage system for storing data. Primary applications 106 are applications that may be executed in computer system 100. While shown in this figure as being contained inside operating system 104, primary applications 106 may actually be stored at a physical location distinct from that of operating system 104. Registry/start up file 108 contains configuration data such as a list of applications to execute when the operating system 104 is initiated and other information relevant to the configuration of operating system 104. Here, registry/start up file 108 may comprise a software entity referred to as a registry that contains different configuration data. Alternatively or in addition, registry/start up file 108 may comprise one or more files for storing configuration data. Detection system 110 contains code for implementing detection of and reaction to hostile software in accordance with this embodiment of the invention. Thus, detection system 110 may comprise any executable code, such as a script file, application program, system driver, and/or hardware, such as those used to monitor the computer system 100.

Here, computer system 100 may be a personal computer, a server, or any other device utilizing an operating system. In particular, computer system 100 may comprise or be part of a closed system that does not receive regular user interaction in its normal operations. Some examples of closed systems include routers, embedded computer systems such as automobile computers and computers used in manufacturing, telephony switches, network access servers such as those used in connection with dial-up connection services and Internet service providers. Such closed systems are typically installed, configured, and then left alone unless a problem occurs. Advantages provided by the present invention may prove especially beneficial in allowing such closed systems to perform self-monitoring and attempt recovery should an attack by hostile software occur.

Hostile software may be introduced to computer system 100 via network 102. As shown in FIG. 1, network 102 is also connected to one or more other computer systems 112 and 114. Certainly, network 102 may be connected to other computers and other networks. Network 102 may be a private network or a public network. Network 102 may be connected to or be part of a local area network or wide area network. Indeed, network 102 may be connected to or be part of what is commonly referred to as the Internet. As more and more devices such as computer system 100 become network-enabled, there is an increasing risk of attack by hostile software introduced via a network connection.

Figure 2:
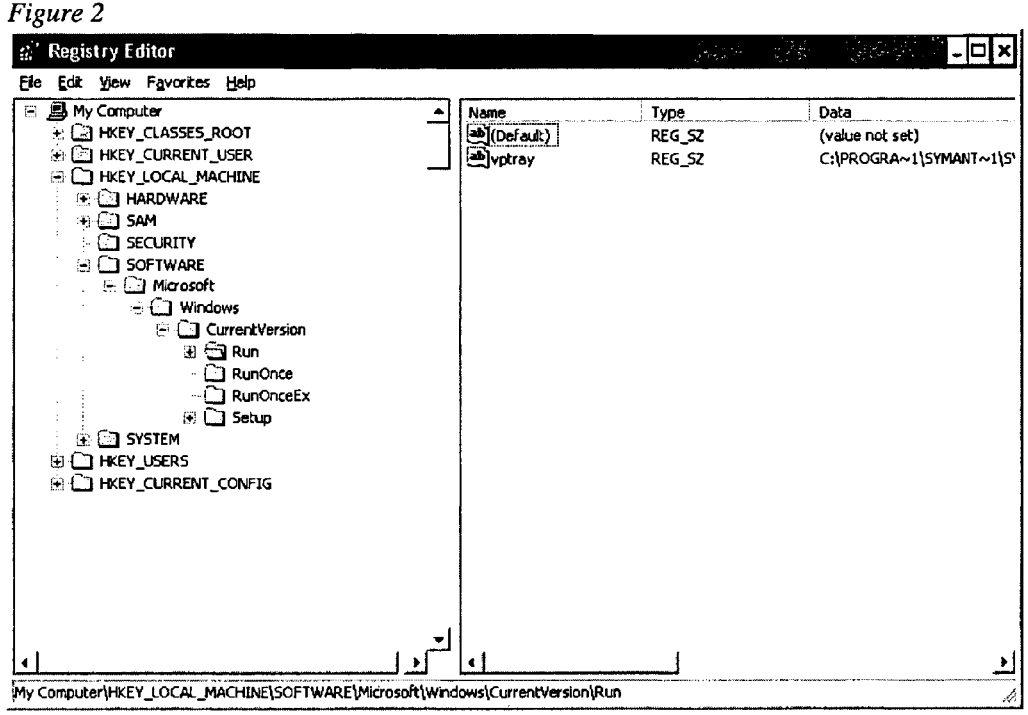
FIG. 2 illustrates a user interface representation of a registry having a tree-like structure and containing keys having configuration data utilized in various embodiments of the present invention.

FIG. 2 illustrates a user interface representation of a registry having a tree-like structure and containing keys having configuration data utilized in various embodiments of the present invention. Many types of operating systems may organize configuration data useful for hostile software detection in a software entity referred to as a registry. The registry may be viewed as a database of settings maintained for the operating system. It is often the case that information in the registry is backed up in memory when the operating system is running, so that access to the registry may create very little if any disruption to the active operating system. As shown in FIG. 2, a registry typically has a tree-like structure reminiscent of the organization of files in directories or folders. A number of registry keys in the registry are visible in FIG. 2, including:

HKEY_LOCAL_MACHINE/SOFTWARE/Microsoft/Windows/CurrentVersion/Run

HKEY_LOCAL_MACHINE/SOFTWARE/Microsoft/Windows/CurrentVersion/RunOnce

HKEY_LOCAL_MACHINE/SOFTWARE/Microsoft/Windows/CurrentVersion/RunOnceEx

Examples of operating systems that organize configuration data in a registry include Microsoft Windows-based operating systems such as Windows NT, Windows NT Server, Windows 95, Windows 98, Windows 2000, Windows 2000 Professional, Windows XP Home, Windows XP Professional, and Windows XP Embedded.

Configuration data such as that shown in the registry illustrated in FIG. 2 may contain information relating to executable code that may be executed in the computer system. Here, executable code broadly refers to any portion of code capable of being executed in a computer system, such as a script file, application program, system driver, and others. Thus, the configuration data may include, for example, a list of application programs that are to be launched when the operating system is initiated.

Figure 3:
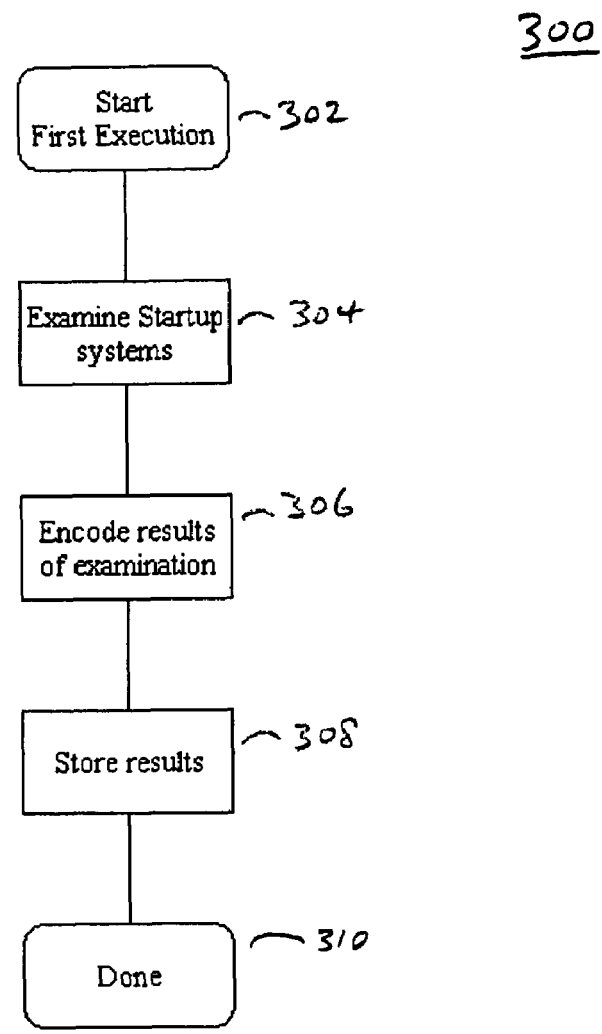
FIG. 3 is a flow chart outlining basic steps for storing configuration data in accordance with one embodiment of the present invention.

FIG. 3. is a flow chart 300 outlining basic steps for storing configuration data in accordance with one embodiment of the present invention. In a step 302, an operating system such as operating system 104 in computer system 100 is started. In a step 304, the startup system of the operating system is examined to obtain relevant configuration data that may be useful for hostile software detection. The configuration data may be obtained from one or more keys in a registry such as shown in FIG. 2. Generally speaking, the configuration data that is obtained may or may not be an exact copy of the configuration data maintained by the operating system. For example, the configuration data obtained may be a subset or summary of the configuration data maintained by the operating system. Thus, the data obtained may also be referred to here as a representation of the configuration data. In a step 306, the configuration data obtained from the examination is encoded. Here, encoding broadly refers to the transformation of data into a different format. Thus, encoding may include encryption, cryptography, obfuscation, and/or other techniques. Next, in a step 308, the result of the encoding is stored. Storing the configuration data in an encoded format make it less vulnerable to manipulation by hostile software, which may attempt to add itself as a valid entry in the stored configuration data. At step 310, the process for storing configuration data according to the present embodiment is complete.

Figure 4:
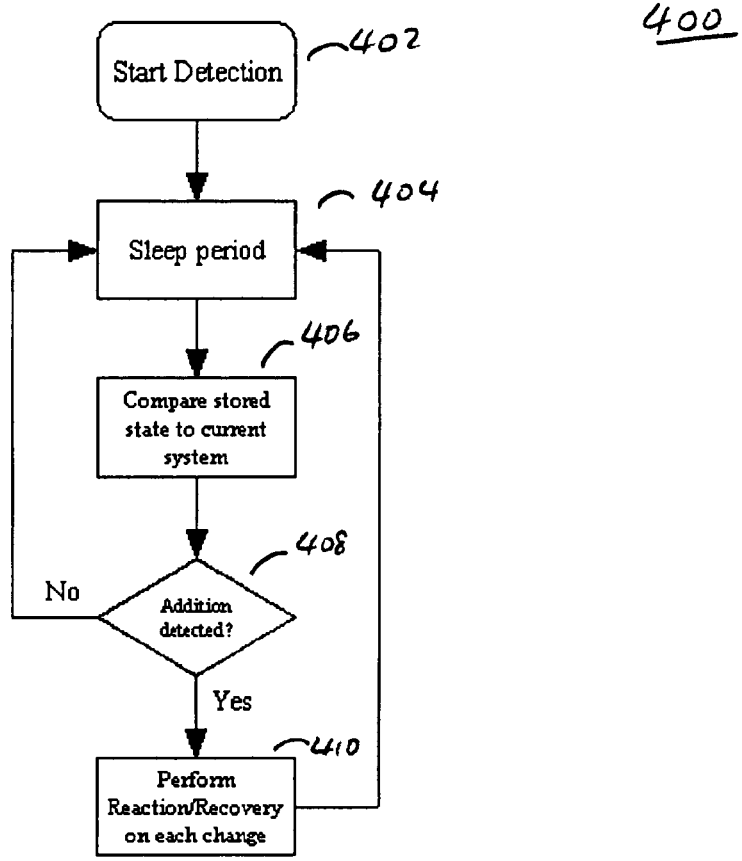
FIG. 4 is a flow chart outlining basic steps for detecting hostile software based on configuration data and comparing stored configuration data to that of the current system, detecting a deviation, and performing a reaction or recovery task in accordance with one embodiment of the present invention.

FIG. 4 is a flow chart 400 outlining basic steps for detecting hostile software based on configuration data and comparing stored configuration data to that of the current system, detecting a deviation, and performing a reaction or recovery task in accordance with one embodiment of the present invention. In a step 402, the detection process is started. In a step 404, the process enters a sleep state. Whenever detection of hostile software is desired, the process may exit the sleep state to perform steps necessary for such detection. Accordingly, the process may exit the sleep state on a regular basis, such as once every 15 minutes, to perform detection tasks. Other schedules or arrangements for determining when to exit the sleep state are certainly possible. Upon exit from the sleep state, in a step 406, the stored configuration data is compared with current configuration data obtained from the active operating system. Again, the current configuration data obtained from the active operating system may or may not be an exact copy of the configuration data maintained by the operating system. Thus, the data obtained may also be referred to here as a representation of the configuration data. If the comparison performed in step 406 results in the detection of a deviation between the stored configuration data and the current configuration data, the process moves to a step 410. Else, the process returns to step 404. In step 410, at least one reaction or recovery task is performed for each deviation detected. Upon completion of step 410, the process returns to step 404.

Figure 5:
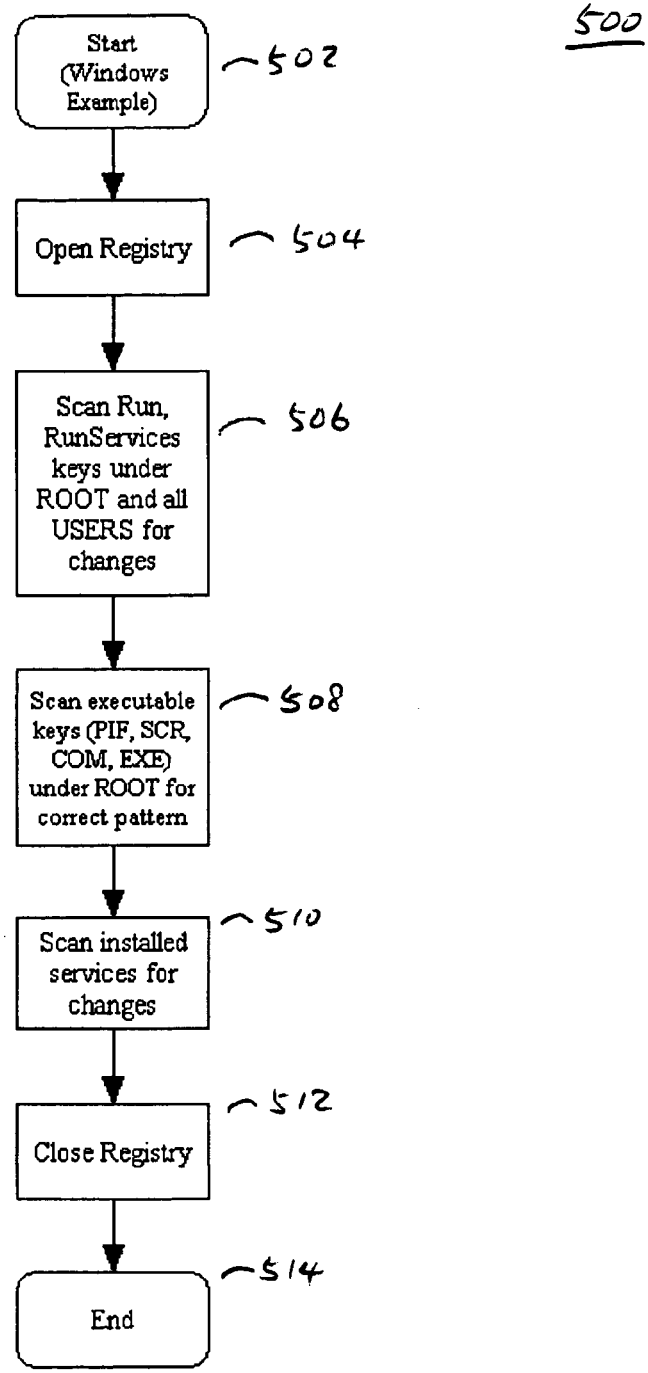
FIG. 5 is a more detailed flow chart outlining steps in one example of detecting hostile software in the context of a Windows-based operating system in accordance with one embodiment of the present invention.

FIG. 5 is a more detailed flow chart 500 outlining steps in one example of detecting hostile software in the context of a Windows-based operating system in accordance with one embodiment of the present invention. The steps shown in FIG. 5 may correspond to or replace step 406 in FIG. 4. In a step 502, a particular process for detecting hostile software in a Windows-based operating system is initiated. In a step 504, a registry such as the registry illustrated in FIG. 2 is opened. In a step 506, various registry keys such as Run and RunServices keys under ROOT and all USERS are scanned for any deviation from stored configuration data.

For example, the first registry key used for program startup in a Windows-based operating system may be HKEY_LOCAL_MACHINE/Software/Microsoft/Windows/RunServices. This key is typically scanned when the system starts, and programs listed under it are started. This startup key may be monitored for any additions or other changes. Certain systems may not have this key if there are no programs to be launched at that time. As another example, should a user log in to the operating system, two other keys may be scanned to run programs—one under HKEY_LOCAL_MACHINE, and one under HKEY_CURRENT_USER (which is an alias for the user who is logged in, under HKEY_USERS). In both cases, the relevant key is identified as Software/Microsoft/Windows/Run. All entries under each of these keys are started with the shell of the operating system. These startup keys may also be monitored for any additions or other changes. Once again, if there are no programs to be launched at that time, the keys may not exist. As yet another example, a portion of the registry referred to as the services branch, located at HKEY_LOCAL_MACHINES/System/CurrentControlSet/Service may also be monitored. By detecting change in configuration data, such as addition of new keys, to this portion of the registry, hostile software that attempts to bypass the shell startup sequence of the operating system may also be detected. Also, if file system monitoring on a limited scale is deemed acceptable, then scanning the "Startup" folder of all users, located under the Documents and Settings folder at <user name>\Start Menu\Startup (including under the user 'All Users') is another location from which the shell may load programs. Changes to configuration such as addition of new shortcuts or executables appearing in this folder may also indicate existence of hostile software.

Next, in step 508, executable keys associated with execution of software programs having a particular file extension are scanned. For example one section of the registry is referred to as HKEY_CLASSES_ROOT, which is an alias for HKEY_LOCAL_MACHINE/Software/Classes. This key contains information for files by extension, including identification of the command line to execute when a file is opened. It may be possible for hostile software to insert itself into the execution path for common extensions, thus ensuring it is executed any time the shell opens a file. The main executable file types in Windows-based operating systems may include EXE, COM, SCR and PIF. Thus, under HKEY_CLASSES_ROOT, the command line may be monitored by watching <ext>file/Shell/Open/Command, on it's default value. For the command types listed above, the value should be:

"%1"%*

This value indicates that the program requested (%1) should be executed, and it's arguments are all other arguments passed (%*). If this string is replaced, then any file of that type which is started by the shell will use the new command line. For example, a hypothetical virus with a program name of "VIRUS.EXE" could replace the above string under the 'exefile/Shell/Open/Command' with the following:

VIRUS.EXE "%1"%*

This would cause every executable file ending in .EXE to start the Virus process first (which could then, in turn, start the actual program in order to hide the fact that it was triggered). Thus, step 508 may scans the proper executable key for a correct pattern, such as the default value "%1"%* described above and conclude that hostile software has been detected if deviation from the correct pattern is found.

In a step 510, various registry keys such as installed services are scanned for any deviation from the stored configuration data. Step 510 may be similar to step 506 in operation. In fact, steps 506 and 510 may be performed in succession or combined in some manner, depending on implementation. Next, in a step 512, the registry is closed. Finally, in a step 514, this process for detecting hostile software is completed.

Although not illustrated in FIG. 5, other techniques for detecting hostile software in a Windows-based operating system may be alternatively or additionally implemented. First, removal of configuration information, or failure to remove configuration where such removal is expected, may also indicate existence of hostile software. For example, the following keys are primarily used for upgrades in Windows-based operating system, and therefore may not be found on all machines:

HKEY_LOCAL_MACHINE/Software/Microsoft/Windows/RunServicesOnce

HKEY_LOCAL_MACHINE/Software/Microsoft/Windows/RunOnce

HKEY_CURRENT_USER/Software/Microsoft/Windows/RunOnce

Under normal operations, entries under these key may exist when they are executed, but are then removed from the registry by the operating system. Hostile software may attempt to escape detection by storing its startup commands under such a key, waiting for the operating system to remove entries under the key, then restore its data under the key. Thus, in one embodiment of the invention, hostile software detection may involve sensing that one or more keys/entries exist and later verifying that they are removed after a restart of the operating system. In the practical application, all HKEY_USERS keys may be tested, not just the CURRENT user.

Second, files separate from the registry may be useful in detection of hostile software in the context of a Windows-based operating system. Even though some of these files may exist and not be used in certain Windows-based operating systems such as Windows 2000 or XP, monitoring of these files may nevertheless assist in the detection of hostile software. For example, the files WIN.INI and SYSTEM.INI in the Windows installation folder, and WINSTART.BAT in the root of the file system may be monitored because hostile software may attempt to modify these files to cause themselves to be loaded under different Windows-based operating systems such as Windows 95, 98 and ME. Thus, it may be the case that the hostile software would not have caused damage by modifying these files, but such file modifications could be utilized to achieve detection of the hostile software. For example, in the WIN.INI file, the keys LOAD= and RUN= may be monitored for additions, which may be complete paths, or program files in the search path. In the SYSTEM.INI file, the SHELL=line may be checked for modifications. Further, the mere existence of the WINSTART.BAT file may indicate possible hostile software activity, since this particular file was intended for use with a much earlier Windows-based operating system, Windows 3.1, although it was still supported under Windows 95 and 98.

Third, the shell configuration may also be monitored to assist in the detection of hostile software. The shell configuration may be specified in older versions of Windows in the text-based SYSTEM.INI file, but is transparently remapped to the registry in NT-based versions of Windows. It resides at HKEY_LOCAL_MACHINE/Software/Microsoft/Windows NT/CurrentVersion/Settings, and it should read "Explorer.exe." Any changes may indicate existence of hostile software. Thus, different steps in FIG. 5 may be added, deleted, combined, or otherwise altered to accomplish hostile software detection in different ways in accordance with various embodiments of the present invention.

FIG. 6 is a more detailed flow chart 600 outlining steps in one example of detecting hostile software in the context of a Linux-based operating system in accordance with one embodiment of the present invention. The steps shown in FIG. 6 may correspond to or replace step 406 in FIG. 4. While this embodiment is specific to Linux-based operating systems, the invention is not necessarily so limited and may be utilized in other Unix-derived operating systems.

Like other operating systems, a Linux-based operating system typically includes means for identifying software that is to be started with the system. Accordingly, as a Linux-based operating system is initiated, it may pass through a series of what are referred to as runlevels. Just as an example, the runlevels defined for the popular Red Hat Linux are as follows:

0—Halt

1—Single-user mode

2—Not used (user-definable)

3—Full multi-user mode

4—Not used (user-definable)

5—Full multi-user mode (with an X-based login screen)

6—Reboot

As the operating system enters each run level, a pre-defined script is executed to prepare that level for use. These scripts may, in turn, launch other scripts, therefore detection under this operating system may be required to be aware of all scripts.

Thus, according the current embodiment of the invention, in a step 602, a particular process for detecting hostile software in a Linux-based operating system is initiated. In a step 604, a startup script at a first runlevel is opened. In a step 606, the script that has been opened is examined for changes. Here, changes may be detected by comparing the script to a stored version of the script. The stored version of the scripts may have been previously stored as illustrated in FIG. 2. The script may launch or otherwise reference other scripts external to itself. Such external scripts may also be examined for changes in a similar manner. Next, in a step 608, any included folders associated with the script may also be examined for changes. Changes may include any deviation such as modification, addition, or removal of data, such as new or altered files. In a step 610, a determination is made whether all scripts in the current runlevel has been examined. If so, the process moves to a step 614, where the process reaches a conclusion. If not, the process moves to a step 612 to open a script at the next runlevel. Following step 612, the process moves back to step 606 for examination of script(s). Thus, in this particular embodiment, an exhaustive examination is conducted of all scripts at all runlevels of the Linux-based operating system. However, the invention is not so limited and may certainly examine only a portion of the existing scripts.

Although not illustrated in FIG. 6, the process may also utilize a time-scheduler system, known on most Linux-based operating systems as cron, to schedule various steps such as those shown in FIG. 6 to be performed at pre-determined time(s).

FIG. 7 is a more detailed flow chart 700 outlining steps for reacting to detection of hostile software in accordance with one embodiment of the present invention. The steps shown in FIG. 7 may correspond to or replace step 410 in FIG. 4. A step 702 indicates the beginning of these steps. At a step 704, an attempt is made to identify suspected executable code and a corresponding file path, based on the change(s) detected between the current configuration data and the stored configuration data. These change(s) may be detected by performing steps such as those illustrated in FIGS. 4, 5, and 6. The suspected executable code may be stored in a file, and the file path may indicate the location of such a file in the computer system. For example, the current configuration data may list an application program, as a particular file located at a specified file path, that is not listed in the stored configuration data. Such an application program may be the suspected executable code identified in step 704. Next, in a step 706, if suspected executable code is identified in step 704, a step 708 is performed. Otherwise, a step 720 is performed. Here, it may be possible that suspected executable code is not identified in step 704, but a change is nevertheless detected between the current configuration data and the stored configuration data. This could indicate that that hostile software may be present to have caused the deviation between the stored configuration data and the current configuration data, but no executable code corresponding to the hostile software can be positively identified.

In step 708, a process list maintained by the operating system may be scanned to determine whether the suspected executable code is currently executing in the computer system. Next, in a step 706, if the suspected executable code is executing, a step 712 is performed. Else, a step 714 is performed. In step 712, execution of the suspected executable code is terminated. In one embodiment of the invention, as the suspected executable code is being executed, it does not receive notification prior to being terminated. For instance, executable code, such as an application program, may typically be terminated in its execution by a message from a user or an operating system, instructing it to exit. This gives the program a chance to close open resources, save settings, or complete other tasks prior to termination. When the executable code is suspected of being hostile software, it may be useful to terminate execution of that code without providing such notification. This may reduce the opportunity for the suspected executable code to attempt or recover itself or perform some type of counter measure. In step 714, storage space such as a hard disk in the computer system is checked in an attempt to locate the executable code where it is stored, such as in a file. In a step 716, if such a file is located, a step 718 is performed. Else, step 720 is performed. In step 718, the file is moved to another location for later evaluation. Such a location may be referred to as a "quarantine" folder or directory. In step 720, the system is reset to match the stored state, by altering the current configuration data associated with the operating system to reflect the stored configuration data. Next, in a step 722, an operator may be notified. Finally, a step 724 indicates the conclusion of these steps.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for detecting hostile software in a computer system comprising:
    storing a representation of configuration data associated with an operating system for the computer system obtained at a first time, wherein the stored representation of configuration data is encrypted prior to being stored;
    comparing the stored representation of the configuration data obtained at the first time with a representation of the configuration data associated with the operating system for the computer system obtained at a second time, wherein the operating system is actively operating at the second time; and if deviation is detected between the stored representation of the configuration data obtained at the first time and the representation of the configuration data obtained at the second time, automatically performing at least one remedial measure in response to the deviation detected, wherein the operating system continues to operate after the at least one remedial measure is performed, wherein the at least one remedial measure comprises determining a storage location associated with suspected executable code in the computer system and moving suspected executable code to a specified storage location for later evaluation, and wherein the at least one remedial measure further comprises determining whether the suspected executable is being executed, and if the suspected executable code is being executed, terminating the execution of the suspected executable code without first providing warning to the suspected executable code prior to terminating the execution to prevent the suspected executable code from performing one or more countermeasures.

2. The method of claim 1 wherein the configuration data relates to identification of executable code installed in the computer system.

3. The method of claim 1 wherein the configuration data relates to identification of a command line for invoking executable code associated with a particular file extension.

4. The method of claim 1 wherein the configuration data is obtained from a registry maintained by the operating system.

5. The method of claim 4 wherein the configuration data obtained from at least one key associated with the registry.

6. The method of claim 1 wherein the configuration data is obtained from a file stored in the computer system.

7. The method of claim 1 wherein the configuration data is compared to a predefined value.

8. The method of claim 1 wherein the configuration data is checked for addition of data.

9. The method of claim 1 wherein the configuration data is checked for removal of data.

10. The method of claim 1 wherein the at least one remedial measure comprises determining whether suspected executable code is currently executing.

11. The method of claim 10 wherein the at least one remedial measure further comprises terminating execution of the suspected executable code.

12. The method of claim 11, wherein the suspected executable code does not receive notification prior to being terminated.

13. The method of claim 1 wherein the at least one remedial measure comprises altering configuration data associated with the operating system to reflect the stored representation of the configuration data.

14. The method of claim 1 wherein the operating system is a Windows-based operating system.

15. The method of claim 1 wherein the operating system is a Linux-based operating system.

16. A computer system capable of detecting hostile software comprising:
a processing unit capable of being controlled by an operating system;
a storage unit coupled to the processing unit, the storage unit capable of storing a representation of configuration data associated with the operating system obtained at a first time, wherein the stored representation of configuration data is encrypted prior to being stored;
wherein the processing unit is capable of comparing the stored representation of the configuration data obtained at the first time with a representation of the configuration data associated with the operating system obtained at a second time, wherein the operating system is actively operating at the second time, and, if deviation is detected between the stored representation of the configuration data obtained at the first time and the representation of the configuration data obtained at the second time, automatically performing at least one remedial measure in response to the deviation detected, wherein the operating system continues to operate after the at least one remedial measure is performed, wherein the at least one remedial measure comprises determining a storage location associated with suspected executable code in the computer system and moving suspected executable code to a specified storage location for later evaluation, and wherein the at least one remedial measure further comprises determining whether the suspected executable is being executed, and if the suspected executable code is being executed, terminating the execution of the suspected executable code without first providing warning to the suspected executable code prior to terminating the execution to prevent the suspected executable code from performing one or more countermeasures.

17. A system for detecting hostile software in a computer system comprising:
means for storing a representation of configuration data associated with an operating system for the computer system obtained at a first time, wherein the stored representation of configuration data is encrypted prior to being stored;
means for comparing the stored representation of the configuration data obtained at the first time with a representation of the configuration data associated with the operating system for the computer system obtained at a second time, wherein the operating system is actively operating at the second time; and
means for automatically performing at least one remedial measure in response to the deviation detected, if deviation is detected between the stored representation of the configuration data obtained at the first time and the representation of the configuration data obtained at the second time, wherein the operating system continues to operate after the at least one remedial measure is performed, wherein the at least one remedial measure comprises determining a storage location associated with suspected executable code in the computer system and moving suspected executable code to a specified storage location for later evaluation, and wherein the at least one remedial measure further comprises determining whether the suspected executable is being executed, and if the suspected executable code is being executed, terminating the execution of the suspected executable code without first providing warning to the suspected executable code prior to terminating the execution to prevent the suspected executable code from performing one or more countermeasures.

18. An article of manufacture comprising:
a computer usable medium having computer readable program code means embodied therein for causing hostile software to be detected in a computer system, the computer readable program code means in said article of manufacture comprising:
computer readable program code means for causing a computer to store a representation of configuration data associated with an operating system for the computer system obtained at a first time, wherein the stored representation of configuration data is encrypted prior to being stored;

computer readable program code means for causing the computer to compare the stored representation of the configuration data obtained at the first time with a representation of the configuration data associated with the operating system for the computer system obtained at a second time, wherein the operating system is actively operating at the second time; and computer readable program code means for causing the computer to automatically perform at least one remedial measure in response to the deviation detected, if deviation is detected between the stored representation of the configuration data obtained at the first time and the representation of the configuration data obtained at the second time, wherein the operating system continues to operate after the at least one remedial measure is performed, wherein the at least one remedial measure comprises determining a storage location associated with suspected executable code in the computer system and moving suspected executable code to a specified storage location for later evaluation, and wherein the at least one remedial measure further comprises determining whether the suspected executable is being executed, and if the suspected executable code is being executed, terminating the execution of the suspected executable code without first providing warning to the suspected executable code prior to terminating the execution to prevent the suspected executable code from performing one or more countermeasures.

\* \* \* \* \*